United States Patent Office 3,427,501
Patented Feb. 11, 1969

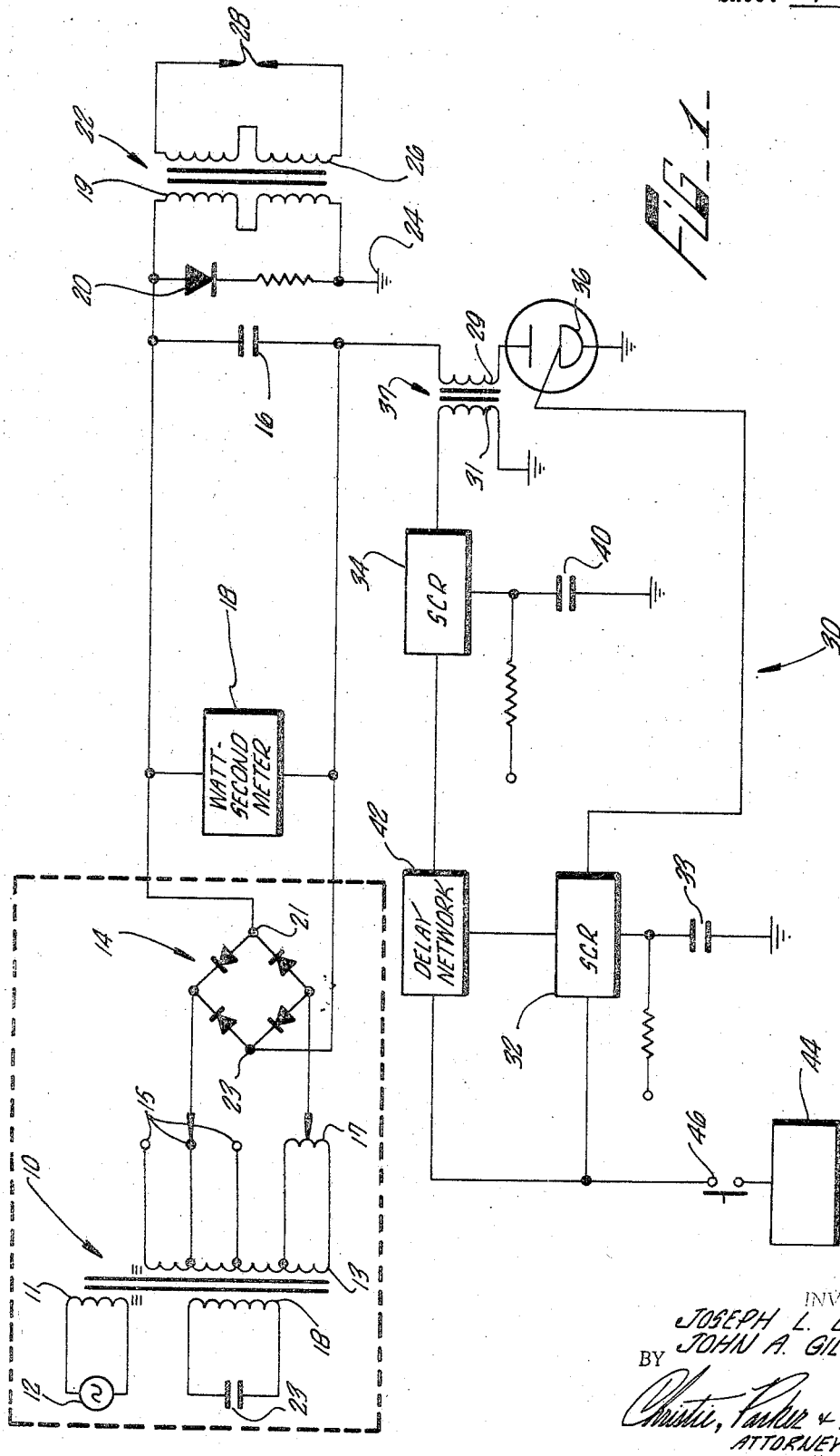

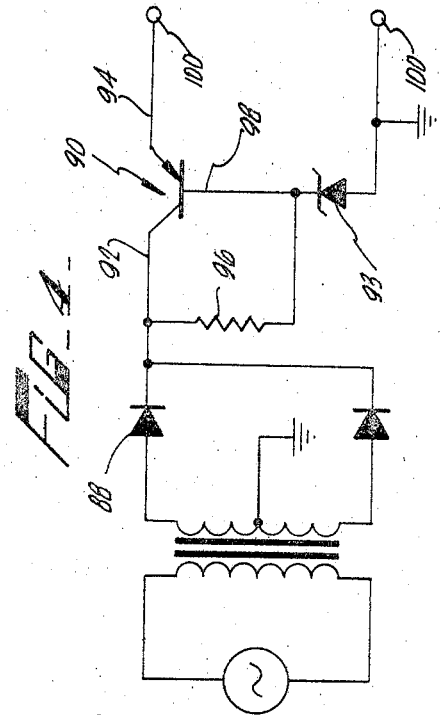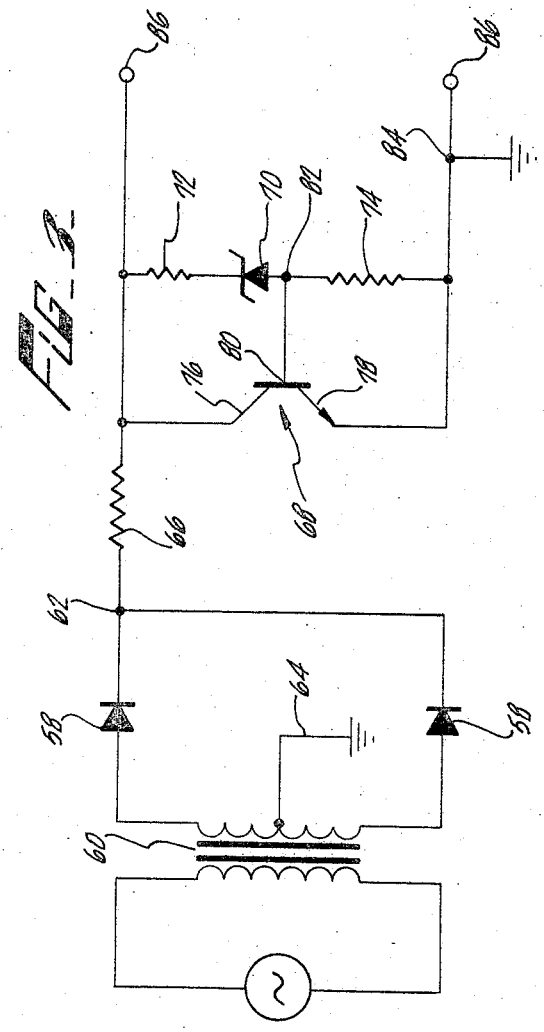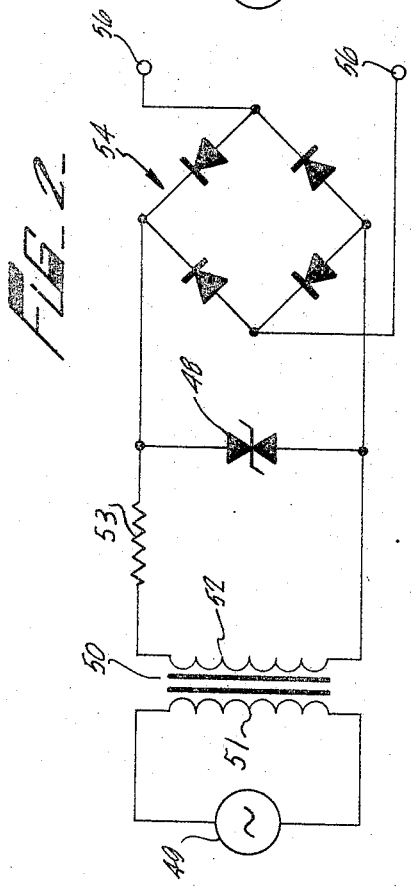

3,427,501
CAPACITOR LINEAR CHARGING POWER SUPPLY
Joseph L. Laub, Claremont, and John A. Gilbert, Upland, Calif., assignors to Unitek Corporation, Monrovia, Calif., a corporation of California
Filed Sept. 3, 1965, Ser. No. 484,844
U.S. Cl. 315—200
Int. Cl. H05b 41/36
14 Claims

ABSTRACT OF THE DISCLOSURE

The present disclosure is directed to an improved capacitve storage circuit means which is linearly charged from a source of electrical energy and intermittently discharged through a load circuit. The capacitive means is connected to a source of alternating current electrical energy through means for shaping the A.C. waveform into a rectified square wave. The rectified square wave supplies the energy for charging the capacitor. The remainder of the power supply comprises a load circuit and control circuit means for periodically discharging the capacitive means through the load circuit. The control circuit means discharges the capacitive means by closing a circuit between capacitive means and the load circuit and at a subsequent point in time opening the circuit and discontinuing the discharge to allow the capacitive means to be recharged to the predetermined value.

---

The present invention relates to power supplies using a capacitor for energy storage and, in particular, to welding power supplies for use in high production applications.

High production power supplies for welding electrical and mechanical parts such as micro-switches, transistor headers, gauges, and stamped components fed by high-speed jigs and fixtures are normally circuits utilizing the controlled charge principle in which an energy-storage capacitor is rapidly charged and discharged and serves as a source of welding energy. A typical high-speed circuit employs a controlled-grid rectifier or ignitron voltage-regulating circuit and supporting phase-shift network for achieving close control over the voltage to which the energy storage capacitor is charged. The phase-shift network provides a means for achieving close control of capacitor charging by adjusting the phase angle at which the charging current is supplied to the condenser. Because of practical limitations such as maximum available line current and component-size limitations, e.g., transformers, such circuits are limited to a certain maximum welding speed.

The present invention also provides an energy storage system utilizing an energy storage capacitor but eliminates the use of the controlled grid rectifier or ignitron and phase shifting network, reduces line current transient loads, and at the same time substantially increases the maximum possible number of welds per unit time thus increasing the overall speed of a welding system using such a supply.

The invention is a power supply comprising capacitive means to be charged to a predetermined voltage for storing electrical energy. The capacitive means is connected to a source of alternating current electrical energy through means for shaping the A.C. waveform into a rectified square wave. The rectified square wave supplies the energy for charging the capacitor. The remainder of the power supply comprises a load circuit and means for periodically discharging the capacitive means through the load circuit. The control circuit discharges the capacitive means by closing a circuit between capacitive means and the load circuit and at a subsequent point in time opening the circuit and discontinuing the discharge to allow the capacitive means to be recharged to the predetermined value.

In the well-known prior art circuit referred to above, charging of the energy-storage capacitor is asymptotic. In order to provide that the capacitor be charged to the desired voltage at a rapid rate, the input of the thyratron rectifier circuit must be supplied with a voltage which is substantially higher than the predetermined voltage to which the capacitor was to be charged. To provide that the charge on the capacitor does not exceed the predetermined voltage a phase-shift network is provided which provides a voltage control to prevent further charging when the condenser reaches its predetermined voltage.

The present invention eliminates the controlled grid rectifier, etc. and phase shift circuit of the prior art voltage regulator and utilizes wave shaping means for supplying D.C. pulses for charging the energy storage capacitor.

One specific form of wave shaping means employed is a current limited transformer. This type of transformer is specifically designed such that the maximum current (i.e. when the secondary winding has a short circuit applied to it) output is limited to a predetermined value. As used in the power supply of this invention the transformer or wave shaping means output charges the energy storage capacitor through suitable rectifying means at a constant linear rate instead of an asymptotic rate.

This means that, for a given line current, energy storage capacitor charging time is substantially shorter than in conventional circuits. Under normal maximum available line currents this faster charging rate means that the storage capacitor can now be charged to normal maximum voltages approximately twice as many times per unit time, an improvement in excess of 100 percent relative to presently available power supplies. By providing means for adjusting the number of turns in the secondary winding of the current limited transformer or other transformer supplied as part of the wave shaping means the charging current can be varied over a wide range to suit the needs of each particular situation.

With the supply of this invention, the supply voltage to the energy storage capacitor need no longer be set at a value substantially in excess of the voltage to be placed on the capacitor. Use of the control circuit provides positive timing of energy pulses and insures restoration of original circuit conditions to permit capacitor recharging.

These and other advantages will be more readily understood by reference to the accompanying figures wherein:

FIG. 1 is a schematic diagram of a power supply according to the present invention utilizing a current limited transformer and diode bridge as the wave-shaping means;

FIG. 2 is an alternate embodiment of the wave-shaping means;

FIG. 3 is another alternate embodiment of the wave-shaping means;

FIG. 4 is a third alternate embodiment of the wave-shaping means;

Figure 5A:
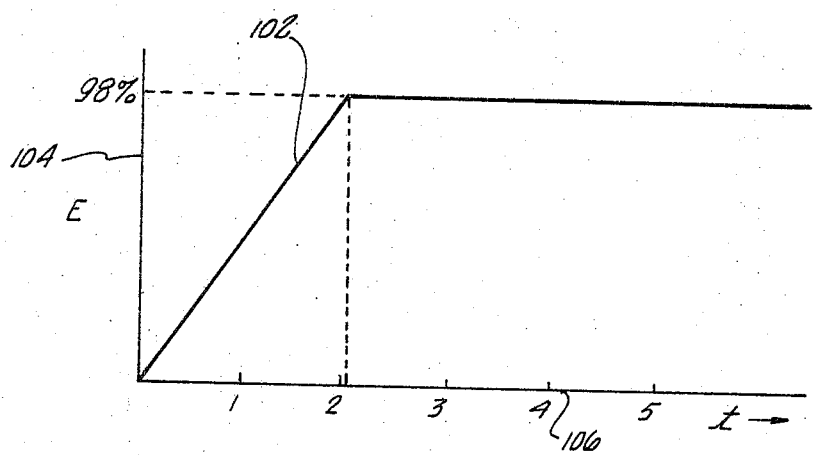
FIG. 5A is a graph showing the charging rate of the capacitor in the power supply of the present invention.

The circuit of FIG. 1 comprises a current limited resonant transformer 10 with a primary winding 11 connected to a source of A.C. power 12 and a current limited secondary winding 13 having a variable voltage control comprising a plurality of voltage taps 15 and an autotransformer 17. The primary side of the transformer has an auxiliary winding 18 which is connected to a capacitor 23 which resonates at line frequency. The function of capacitor 23 is to provide an LC resonant circuit using a decoupled portion of the secondary winding as the inductor. The transformer is also provided with a magnetic shunt to provide the decoupling. The decoupling magnetic shunt limits the current in the secondary winding, prevents it from exceeding a predetermined maximum and provides a square wave output.

Transformer 10 is of the type such as is described in Electronic Transformers and Circuits, Reuben Lee, John Wiley and Sons, Inc., 2nd ed. 1955. A selected one of the taps 15 and the autotransformer 17 are connected respectively to one of the two input nodes of a rectifier bridge 14. The output nodes 21 and 23 of the bridge are in turn connected across a watt-second meter 18. A clamping diode 20 and the primary winding 19 of a pulse transformer 22 are connected between node 21 and a common terminal 24. A welding energy storage capacitor 16, preferably of the oil-filled type, is also connected across the rectifier output nodes. The side of capacitor 16 connected to node 23 is also connected to one side of the secondary winding 29 of an ignitron cutoff transformer 37.

The secondary winding 26 of pulse transformer 22 is connected to a pair of welding electrodes 28. The number of turns on the primary and secondary windings of pulse transformer 22 are adjustable to obtain pulses of welding energy of several different durations. The workpiece to be welded is positioned between the welding electrodes 28 by means of jigs or fixtures (not shown).

A control circuit 30 is connected to the other side of the secondary winding 29 of transformer 37 and to the primary winding 31 of the same transformer. This circuit controls the discharge of energy from capacitor 16 and restores original circuit conditions after each discharge of the capacitor. Control circuit 30 includes a source of triggering signals 44, threshold switching devices such as silicon controlled rectifiers (SCR) 32 and 34, a delay network 42, a controlled ignition discharge device 36 (ignitron) and the ignitron cutoff transformer 37. The silicon controlled rectifiers connect capacitors 33 and 40 to the controlled ignition discharge device 36 and the primary winding 31 of transformer 37 respectively. The side of the secondary winding 29 opposite capacitor 16 is connected to the anode of ignitron 36. The cathode of the ignitron is connected to a common terminal or ground. In place of the ignitron, other switching devices such as one or more silicon controlled rectifiers can be also used.

The control circuit provides the means for closing the welding portion of the circuit to supply energy to the electrodes. In addition, circuit 30 insures positive restoration of the original condition of the welding circuit by preventing energy stored in pulse transformer 22 as leakage inductance from sustaining conduction of ignitron 36 and thus preventing recharging of capacitor 16. A switch 46 is provided for connecting control circuit 30 to the source of triggering signals 44. Switch 46 may be either manual or automatic. The triggering signals are normally generated by a switch or other means attached to jigs or holders used to position the workpiece to be welded between the welding electrodes.

In operation the circuit performs as follows. The capacitor charging portion of the circuit is connected to the source of A.C. power 12 and the voltage controls on the secondary winding of transformer 10 are adjusted to provide the voltage to which it is desired to charge capacitor 16. Because transformer 10 supplies a constant current to rectifier bridge 14 the charging rate of capacitor 16 is a linear function (see FIG. 5A). Current continues to flow from the secondary winding 13 until the capacitor has charged to the desired voltage. The charging time depends on circuit parameters and the output voltage of transformer 10. For example, where the output voltage of transformer 10 is set at approximately 1500 volts, the capacitor charges in approximately 100 milliseconds.

When the capacitor 16 is charged, the circuit is ready for the welding operation. Assuming automatic operation, a remote triggering pulse causes silicon controlled rectifier 32 to conduct and to transmit a pulse stored in capacitor 33 through SCR 32 to the ignitron 36. The amplitude of the pulse from capacitor 33 is selected such that it is sufficient to cause the ignitron 36 to break down and conduct. At the same time the triggering pulse is transmitted to delay network 42. Delay network 42 which can be of several types well known in the art determines the time interval between the start and termination of the weld pulse. In the preferred embodiment of this circuit, delay network 42 generates two signals, one for producing cutoff of the ignitron 36 and the second for resetting the threshold devices.

Conduction of ignitron 36 completes a circuit from ground through the secondary winding 29 of transformer 37, capacitor 16, the primary winding 19 of pulse transformer 22 and back to ground 24 thereby providing a discharge path for capacitor 16. The electrical energy flowing in the primary winding of the transformer 22 is induced into the secondary winding 26 and transmitted to welding electrodes 28 to complete the welding operation.

After the lapse of a predetermined time interval, a signal from delay network 42 is transmitted to SCR 34 causing it to conduct and transmit a voltage pulse of predetermined amplitude stored on capacitor 40 to the primary winding 31 of transformer 37. The discharge of capacitor 40 through winding 31 induces a voltage into the secondary winding of transformer 37 of sufficient magnitude to drive the anode of ignitron 36 negative and insure cut-off. The voltage induced in the secondary winding 29 prevents energy from the collapsing magnetic fields associated with the primary winding of pulse transformer 22 from sustaining conduction of ignitron 36 which would, in turn, prevent recharging of capacitor 16. Positive cut-off of ignitron 36 insures that the power supply circuit is returned to its starting condition.

After lapse of a second short interval, delay network 42 transmits a second signal to SCR 32 and 34 to cause them to change state and allow capacitors 33 and 40 to be recharged. The supply circuit is now restored to its original state ready for transmission of another triggering pulse from source 44.

The schematic diagrams in FIGS. 2, 3, and 4 illustrate alternate circuits for the portion of the circuit of FIG. 1 within the dotted enclosure for supplying a square wave signal to the welding energy storage capacitor for providing the more rapid charging of the welding energy storage capacitor.

FIG. 2 illustrates the use of a double-anode Zener diode 48 used in place of a current-limited transformer to clip the peaks of the output signal obtained from the secondary winding 52 of a transformer 50 which is connected by means of its primary winding 51 to a source of A.C. power 49. An impedance 53 is connected in series circuit relationship with secondary winding 52. By proper choice of Zener diode rating and input level at the A.C. source, the output from the double Zener diode 48 is substantially a square wave in form. This square wave signal is then transmitted to a diode bridge 54 where the signal is rectified and a series of D.C. pulses is presented to the remainder of the power supply circuit from terminals 56.

In FIG. 3 a pair of diodes 58 and a transformer 60 having a grounded center tap provide a full wave rectified signal to a terminal 62 common to the output from the diodes. The full wave rectified output from the secondary winding of transformer 60 is connected via resistor 66 to a transistor 68 and a Zener diode 70. Suitable biasing resistors 72 and 74 are provided in series with the Zener diode and are in turn connected to a pair of output terminals 86. Transistor 68 is connected by means of its collector electrode 76 to the common connection point of resistor 66 and resistor 72 and by means of its emitter electrode to the common connection point of resistor 74 and one of the output terminals 86. The base electrode 80 of transistor 68 is connected to a terminal 82 which is common to diode 70 and biasing resistor 74. The connection point common to resistor 74, collector electrode 78 and output terminal 86 is connected to ground at terminal 84.

In operation the rectified output voltage from transformer 60 is applied to the base of transistor 68 through Zener diode 70 to provide substantially square D.C. pulses at output terminals 86. Current flow to the base of transistor above the breakdown voltage of Zener diode 70 causes conduction of transistor 68 and shunting of the portion of the rectified output signal above the breakdown level of the Zener to ground. The embodiment of FIG. 3 enables control of the relatively high signal levels common to a welding power supply by means of a low-power Zener diode.

FIG. 4 illustrates still another form of the square wave generator for providing rectified D.C. pulses to the welding energy storage capacitor. In this circuit a full wave rectifier 88 similar to that shown in FIG. 3 is connected to a circuit configuration similar to an emitter follower regulator. This portion of the circuit includes a transistor 90 having collector and emitter electrodes 92 and 94 connected in series with the output of rectifier 88 and an output terminal 100 respectively. The base electrode 94 is connected to ground through a Zener diode 92. A biasing resistor 96 is connected between the collector electrode 92 and base electrode 98 and a connection between a second output terminal 100 and ground completes the circuit. The output terminal 100 connects the wave shaping means to the remainder of the power supply circuit.

In operation the transistor 90 regulates the output voltage from rectifier 88 to the level of the breakdown voltage of Zener diode 92. The output from rectifier 88 is transmitted to output terminals until Zener 93 breaks down. Due to the emitter follower configuration the output at emitter electrode follows the clipped sine wave base voltage characteristic thereby transmitting a series of pulses which are substantially in the form of a rectified square wave to terminals 100 and to the welding energy storage capacitor.

The linear charging function 102 of the capacitor in a circuit according to the present invention is shown in FIG. 5A. The potential on the capacitor is plotted along the ordinate 104 and time along the abscissa 106.

Figure 5B:
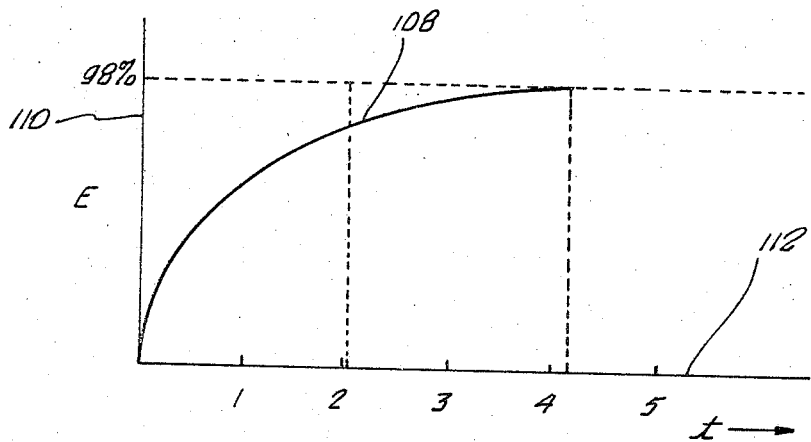
FIG. 5B is a graph showing the charging rate of the capacitor in a conventional power supply.

FIG. 5B is a graph of the asymptotic charging function 108 of a typical prior art circuit. Both graphs are based on the assumption of the same maximum line current being available to both circuits. Again the potential on the capacitor is plotted along the ordinate 110 and time along the abscissa 112. The scale along abscissa 112 is based on the time constant of the circuit. As seeen from FIG. 5B the prior art circuit charging at the asymptotic rate requires a time equivalent to in excess of four time constants to achieve 98% of full charge. In contrast the capacitor in the present circuit achieves the same charge level in approximately half the time.

In addition to its use as a welding power supply the circuit of the present invention is adaptable for use in many power supply applications requiring periodic storage and discharge of energy from a capacitor. Such applications include power supplies for use with lasers, stroboscopes, ignition systems, photoflash equipment, energy-burst devices and the like.

What is claimed is:

1. A power supply comprising:
   capacitive means to be charged to a predetermined voltage for storing electrical energy,
   a souce of A.C. electrical energy, the energy from the source having a predetermined waveform,
   means connected to the source of energy for shaping the waveform from the source such that the waveform is substantially in the form of a rectified square wave signal having a predetermined peak amplitude,
   means for connecting the waveform shaping means to the capacitive means for transmitting the rectified square wave signal to charge the capacitive means to said predetermined peak amplitude at a linear rate,
   a load circuit, and
   means for intermeittently discharging the capacitive means through the load circuit.

2. A welding circuit according to claim 1 wherein the means for shaping the waveform from the energy source comprises:
   a transformer having a primary winding and a secondary winding, the primary winding being conected to the source of energy,
   impedance means connected in series circuit relationship with the secondary winding,
   a pair of Zener diodes connected in opposed series circuit relationship connected across the impedance means secondary winding series circuit combination, and
   a diode bridge having input and output terminals, the input terminals being connected across the impedance means secondary winding series circuit combination and the pair of Zener diodes.

3. A welding circuit according to claim 1 wherein the means for shaping the waveform from the energy source comprises:
   a transformer having a primary winding, a secondary winding and a center tap on the secondary winding, the primary winding being connected to the source of energy, the center tap being connected to a reference terminal,
   a pair of diodes, each diode being connected to opposite ends of the secondary winding, the diodes and grounded center tap forming full wave rectifying means for the output from the secondary winding, the rectifying means having an output,
   a transistor having emitter, collector and base electrodes, the emitter and collector electrodes being connected in series with the output of the rectifying means,
   a Zener diode connected between the base electrode and the reference terminal, and
   resistive means connected between the collector and base electrodes.

4. A welding circuit according to claim 1 wherein means for shaping the waveform from the energy source comprises:
   a transformer having a primary winding, a secondary winding and a center tap on the secondary winding, the primary winding being connected to the source of energy, the center tap being connected to a reference terminal,
   a pair of diodes, each diode being connected to opposite ends of the secondary winding, the pair of diodes and grounded center tap providing means for rectifying the output from the secondary winding, the rectifying means having an output,
   a transistor having emitter, collector and base electrodes,
   resistive means for connecting the collector electrode to the output of the rectifying means,
   a Zener diode having an anode and a cathode,
   resistive means for connecting the cathode and collector electrode,
   means for connecting the anode and base electrode,
   resistive means for connecting the emitter electrode and the anode, and
   means for connecting the emitter electrode and a reference terminal.

5. A stored energy welding circuit comprising:
   a source of A.C. electrical energy, the energy from the source having a predetermined waveform,
   means connected to the source of energy for shaping the waveform from the source such that the waveform is substantially in the form of a rectified square wave signal having a predetermined peak amplitude,
   capacitive means connected to the shaping means for storing the electrical energy in the rectified square wave signal, the capacitor means being charged to said predetermined peak amplitude, a pair of welding electrodes connected across the capacitive means, and means for intermittently discharging the capacitive means through the pair of electrodes.

6. A stored energy welding circuit comprising:
a source of A.C. electrical energy,
a square wave generator having an input and an output, the input being connected to the source of energy,
means connected to the output of the generator for rectifying the square wave therefrom,
capacitive means connected to the rectifying means for storing the electrical energy in the rectified square wave, the capacitor means being charged to a predetermined value at a linear rate by the rectified square wave,
a pair of welding electrodes connected across the capacitive means, and
means for intermittently discharging the capacitive means through the pair of electrodes.

7. A stored energy welding circuit comprising:
a source of A.C. electrical energy, the energy from the source having a predetermined waveform,
means connected to the source of power for clipping the waveform from the source such that the waveform is substantially in the form of a square wave signal having a predetermined peak voltage ampitude,
means connected to the clipping means for rectifying the square wave signal from the clipping means,
capacitive means connected to the rectifying means for storing the electrical energy in the rectified square wave signal, the capacitor means being charged to said predetermined peak voltage amplitude by the rectified square wave,
a pair of welding electrodes connected across the capacitive means, and
means for intermittently discharging the capacitive means through the pair of electrodes.

8. A stored energy welding circuit comprising:
a source of A.C. electrical energy, the energy from the source having a predetermined waveform,
means connected to the source of power for rectifying the waveform from the source,
means connected to the rectifying means for clipping the waveform from the rectifying means such that the waveform is substantially in the form of a rectified square wave signal,
capacitive means connected to the clipping means for storing the electrical energy in the rectified square wave signal,
a pair of welding electrodes connected across the capacitve means, and
means for intermittently discharging the capacitive means through the pair of electrodes.

9. A power supply comprising:
a source of electrical energy,
a transformer having a primary winding and a current limited secondary winding, the primary winding being connected to the source of energy, the output from the secondary winding being substantially in the form of a square wave,
means connected to the secondary winding of the transformer for rectifying the energy received from the transformer,
capacitive means connected to the rectifying means for storing the energy transmitted therefrom,
a load connected across the capacitor means, and
means for intermittently discharging the capacitive means through the load.

10. A power supply comprising:
capacitive means to be charged to a predetermined voltage for storing electrical energy,
a source of A.C. power,
a transformer having a primary winding and a current limited secondary winding, the primary winding being connected to the power source, the output from the secondary winding being substantially in the form of a square wave,
rectifying means connected to the secondary winding for supplying direct current for charging the capacitive means,
a load circuit, and
a control circuit for intermittently connecting the capacitive means with the load circuit, the control circuit including means for closing a circuit between the capacitive means and the load circuit and means for opening the circuit between the capacitive means and the load circuit at a predetermined interval after closing.

11. A stored energy welding circuit comprising:
a pair of input terminals,
a source of A.C. electrical energy connected to the input terminals,
a transformer having a primary winding and a current limited secondary winding, the primary winding being connected to the input terminals,
means connected to the secondary winding of the transformer for rectifying the A.C. energy received from the transformer, the rectifying means having an output,
capacitive means connected across the output of the rectifying means for storing the energy transmitted therefrom,
a reference terminal,
means for clamping one side of the capacitive means to the reference terminal.
a load circuit connected across the capacitive means, the load circuit including a pair of welding electrodes,
a control circuit for intermittently discharging the capacitive means through the welding electrodes, the control circuit including means for closing a circuit between the capacitive means and the load circuit through the reference terminal and means for opening the circuit between the capacitive means and the load circuit at a predetermined interval after closing.

12. A power supply according to claim 11 wherein said control circuit comprises:
a switching device,
a transformer having a primary winding and a secondary winding, the secondary winding being connected between one side of the capacitive means and the switching device,
a pair of switching means, the first switching means being connected to the primary winding of the transformer, the second switching means being connected to the switching device,
means connected to each of the pair of switching means for supplying energy to the primary winding and the controlled switching device respectively,
delay means, and
a source of triggering pulses, the source of triggering pulses being connected by the delay means to the first switching means and being directly connected to the second switching means.

13. A high-production resistance welding circuit comprising:
a capacitor to be charged to a predetermined voltage for storing electrical energy,
a source of A.C. power,
a current limited transformer connected to the source of power,
rectifying means connected to the transformer for supplying direct current for charging the capacitor,
a pulse transformer having a primary winding and a secondary winding, the primary winding being connected across the capacitor,
a pair of welding electrodes connected across the secondary winding of the pulse transformer, and
a control circuit for periodically closing a circuit between the capacitive means and the pulse transformer primary winding and discharging the capacitor through the welding electrodes and for opening the circuit between the capacitor and the pulse transformer primary winding at a predetermined interval after closing.

14. A high production resistance welding circuit comprising:
- a capacitor to be charged to a predetermined voltage for storing electrical energy,
- a source of A.C. power,
- a current limited transformer connected to the source of power,
- rectifying means connected to the transformer for supplying direct curernt for charging the capacitor,
- switching means connected to one side of the capacitor,
- a reference terminal,
- means for connecting the switching means to the reference terminal,
- a pulse transformer having a primary winding and a secondary winding, the primary winding being connected to the other side of capacitor and to the reference terminal,
- a pair of welding electrodes connected across the secondary winding of the pulse transformer, and
- a control circuit for periodically closing the switching means and discharging the capacitor through the welding electrodes and for opening the switching means after lapse of a predetermined time interval.

References Cited
UNITED STATES PATENTS

| | | | |
|---|---|---|---|
| 2,235,385 | 3/1941 | Rava | 315—241 X |
| 2,464,528 | 3/1949 | Rava | 315—241 X |
| 3,240,198 | 3/1966 | Loudon et al. | 315—209 X |
| 3,275,884 | 9/1966 | Segall et al. | 315—209 X |
| 3,315,062 | 4/1967 | Pease | 315—227.1 |
| 3,328,635 | 6/1967 | Webb | 315—209 X |

JOHN W. HUCKERT, *Primary Examiner.*

R. F. POLISSACK, *Assistant Examiner.*

U.S. Cl. X.R.

315—205, 209, 227, 241; 307—268